United States Patent [19]

Paxton

[11] Patent Number: 4,696,233
[45] Date of Patent: Sep. 29, 1987

[54] HIGH PROPELLANT MASS FRACTION HIGHLY STRESS RELIEVED END-BURNING GRAIN STRUCTURE

[75] Inventor: Ronald B. Paxton, Brigham City, Utah

[73] Assignee: Morton Thiokol, Inc., Chicago, Ill.

[21] Appl. No.: 824,806

[22] Filed: Jan. 31, 1986

[51] Int. Cl.⁴ .................................................. C06D 5/06
[52] U.S. Cl. .................................. 102/287; 102/290; 102/288; 102/291
[58] Field of Search ................................. 102/287–292

[56] References Cited

U.S. PATENT DOCUMENTS

| | | |
|---|---|---|
| 3,217,651 | 11/1965 | Braun et al. ........................... 102/287 |
| 3,256,819 | 6/1966 | Leeper ............................. 102/289 X |
| 3,285,012 | 11/1966 | LaRue ............................. 102/287 X |
| 3,691,955 | 9/1972 | Jordan et al. ........................ 102/291 |
| 3,931,765 | 1/1976 | Portalier ............................. 102/291 |
| 3,933,098 | 1/1976 | Portalier ............................. 102/291 |
| 4,466,352 | 8/1984 | Dalet et al. ........................... 102/288 |
| 4,581,998 | 4/1986 | Horst, Jr. et al. ................. 102/292 X |

*Primary Examiner*—Peter A. Nelson
*Attorney, Agent, or Firm*—Gerald K. White

[57] ABSTRACT

An end-burning grain structural arrangement for a solid rocket propellant is formed by two parallel inhibited grain components formed into an "S" shaped cross section. The components form a fully case bonded system and the two components are separated from each other along the "S" which provides stress relief.

9 Claims, 5 Drawing Figures

HIGH PROPELLANT MASS FRACTION HIGHLY STRESS RELIEVED END-BURNING GRAIN STRUCTURE

BACKGROUND OF THE INVENTION

1. Field of the Invention

This invention relates to stress relieved end-burning propellant grain structures and, more particularly, to an improvement thereof that makes practicable a very high propellant mass fraction which is also very highly relieved structurally. "Mass fraction" is the ratio of the mass of the propellant grain in a rocket motor case to the total mass that could be put in the case if it were completely filled.

2. Description of the Prior Art

Solid propellant rocket motors of the end or "cigarette" burning type wherein only the exposed end face of the propellant grain burns are known in the prior art. They are commonly used in the aerospace field of activity for providing rocket thrust in a "sustain" mode of operation. Generally, such motors utilize a thin-walled, high-strength cylindrical rocket motor case into which the propellant grain is cast and cured, the case being closed at the forward end and having a nozzle at the aft end for the emission of exhaust gases.

Problems have been experienced with solid propellant rocket motors of the end burning type stemming from a compelling need that, when cast and cured, the propellant grain must be substantially relieved from stress and strain. Such loads tend to be introduced particularly under the temperature changes that occur during solid propellant rocket motor operational requirements. The propellant grain must be free from even minute cracks or fissures which might tend to propagate under operational loading conditions of the motor and cause unscheduled and uncontrollable burning surfaces that can result in an explosion of the motor.

In order to overcome these problems it is the current practice in the prior art to form the end-burning propellant grain from three parallel propellant components that are separated from each other in the motor case by a longitudinal inhibitor having the shape of a "Y" in cross section with a longitudinal hole or port in the center and a longitudinal hole at each of the three tips for providing internal strain relief. After assembly of the inhibitor in the motor case, in which a suitable liner is provided, the propellant components are cast and cured, being separated from each other by the inhibitor. The inhibitor cross sectional area is substantially equal to the thickness thereof times the motor circumference.

While satisfactory for reducing the strain to which the resulting end-burning grain is subjected, this prior art practice is disadvantageous in that the volume and, hence, mass of propellant grain that can be loaded into the motor case is reduced by the space occupied by the holes at the inhibitor center port and tips. Typically, such reduction expressed in percentages is of the order of two percent. This is not an insignificant factor as it can effect a significant reduction in the desired range of the rocket motor.

There is thus a need and a demand for improvement in the structural arrangement of end-burning rocket propellants to enable the attainment of a high degree of relief from strain and concomitantly the achievement of the maximum volume and, hence, mass of propellant that can be loaded into an operational tactical rocket motor. The present invention was devised to fill the technological gap that has existed in this respect.

SUMMARY OF THE INVENTION

An object of the invention is to provide an end burning propellant grain with a very high mass fraction which is also very highly stress relieved structurally.

In accomplishing this and other objectives of the invention, an end-burning grain arrangement for a solid rocket propellant is formed by two parallel longitudinal components that are cast and cured in the motor case at the same time but are separated by an elongated internal inhibitor between mating surfaces of the components. The components are bonded to the inner side and the closed end walls of the rocket motor case.

The various features of novelty which characterize the invention are pointed out with particularity in the claims annexed to and forming a part of this specification. For a better understanding of the invention, its operating advantages, and specific objects attained by its use, reference is made to the accompanying drawings and descriptive matter in which a preferred embodiment of the invention is illustrated.

BRIEF DESCRIPTION OF THE DRAWINGS

With this description of the invention, a detailed description follows with reference being made to the accompanying drawings which form part of the specification, of which.

DESCRIPTION OF THE PREFERRED EMBODIMENT

Figure 2:
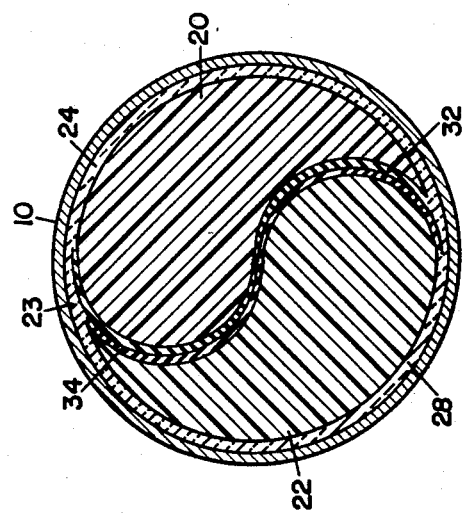
FIG. 2 is a cross sectional view taken on the lines 2—2 of FIG. 1.

The preferred embodiment of the invention, as illustrated in the drawings, comprises an elongated cylindrical rocket motor case 10 having a rocket nozzle 12 open in the aft end, a closed forward end 16, and a solid end-burning rocket propellant grain assembly, indicated at 18, contained therein. Propellant grain assembly 18, as best seen in FIG. 2, includes two separate components, for convenience designated a first component 20 and second component 22 which are identical in cross section and together create, as shown, an "S" shaped design. Assembly 18 contained in case 10 further includes an integral inhibitor/insulator, generally designated 23. Inhibitor/insulator 23 includes an insulator 24 and an inhibitor 32 surrounding grain component 20 and an insulator 28 and an inhibitor 34 surrounding grain component 22. The inhibitors 32 and 34 separate the components 20 and 22 from each other, and the insulators 24 and 32 include portions that cover the cylindrical and forward end walls thereof and are vulcanized to each other and are vulcanized or bonded to the inside of the rocket motor case 10. Case 10 is a thin-walled high strength case and may be made of steel or other suitable material. Case 10 may also be formed, if desired, by wrapping, in known manner, fibers or filaments of aramid polymers that are commercially available from E. I. DuPont de Nemours under its trademark "KEVLAR."

Figures 3, 4:
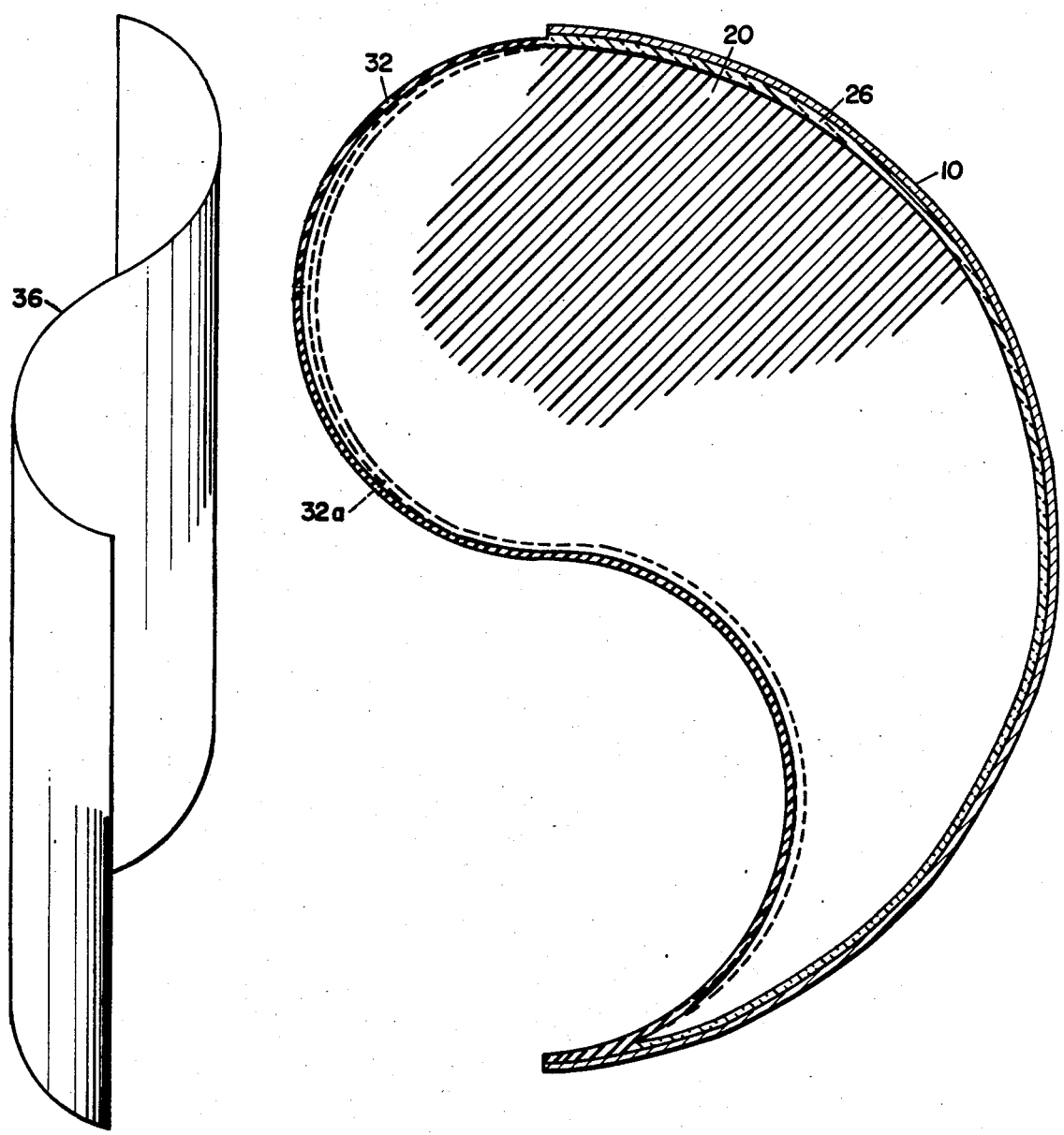
FIG. 3 is a cross sectional view, on an enlarged scale, of one-half of the case/inhibitor/propellant view of FIG. 2.
FIG. 4 is a fragmented pictorial view illustrating a thin sheet metal core that may be employed to hold the "S" shape of the inhibitor during the formation of the propellant grain structure.

One-half, that is, 180 degrees of the case/inhibitor/propellant system, for convenience designated by reference numeral 26, is shown in FIG. 3. As previously indicated, the remaining half, designated 28, of the case/inhibitor/propellant system is identical to system 26. When installed in the rocket motor case 10, however, the system 28 is rotated 180 degrees with respect to the longitudinal center line 30 of the rocket motor 1.

Figure 1:
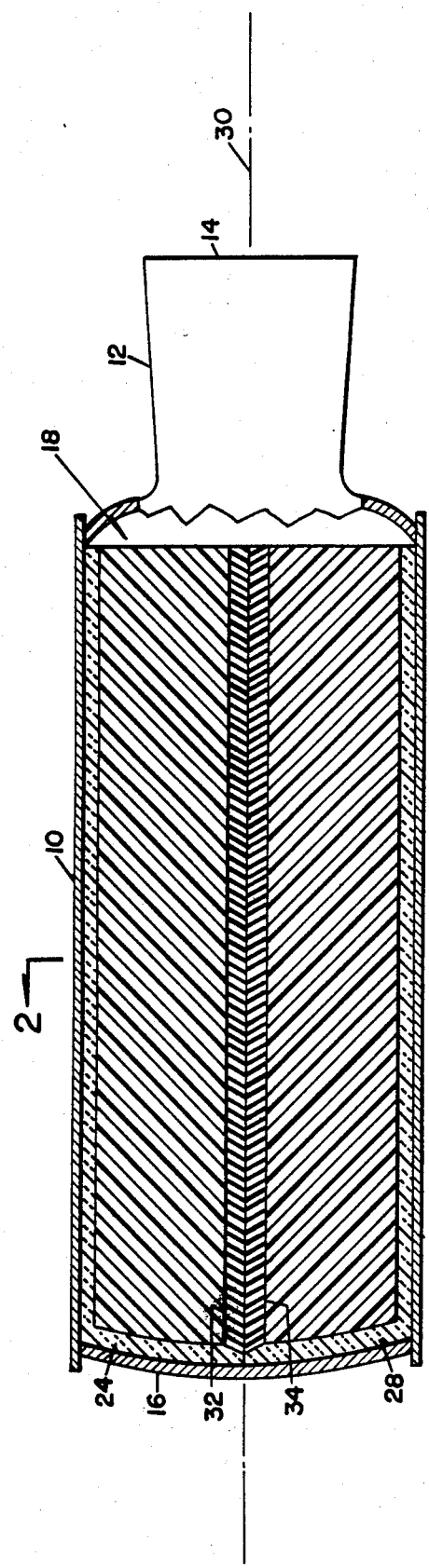
FIG. 1 is a longitudinal sectional view through a rocket motor incorporating the high propellant mass fraction highly stress relieved end-burning grain structure according to the invention.

As shown in FIG. 3, an internal inhibitor 32 which has the shape of an "S" in cross section is bonded to and forms the shape of the propellant grain component 20. A similarly shaped internal inhibitor 34 is bonded to and forms the shape of the propellant grain component 22. In each case, as shown in FIG. 1, the respective internal inhibitor, 32 and 34, extends over and covers the associated forward end of the first and second propellant components 20 and 22, which end, for convenience is referred to hereinafter as the first end. The inhibitor 32 and 34 on the first end of the propellant components, in turn, is covered by a portion of the insulation 24 and 28 that is respectively associated therewith.

In FIG. 3, the dotted "S" shape curve 32a typifies a position assumed by the inhibitor 32 as the result of shrinkage of the propellant component 20 caused by low temperature.

In the formation of the propellant grain assembly 18, the "S" shape of each of the inhibitors 32 and 34 may be formed by the inside contour of a 2-piece mold/mandrel with one piece thereof forming the mold for the grain component 20 and the other for the grain component 22. Steps in the formation of the assembly 18 may include the following:

1. Lay up rubber on each "S" to form the respective inhibitors 32 and 34;
2. Add a layer of TEFLON tape to at least one of the "S" shapes. The generic term for TEFLON, a trademark of E. I. DuPont de Nemours, is tetrafluoroethylene;
3. Bring the two pieces of the mold/mandrel together;
4. Add a layer of insulation around the outside of the assembled pieces and vulcanize together or stage, thus forming the integral inhibitor/insulator 23 including insulators 24 and 28 and inhibitors 32 and 34 as a unitary piece;
5. Machine to the correct outside diameter;
6. Wrap the rocket motor case around the machine outer periphery in a manner known in the art; or alternatively
7. Pull the integral inhibitor/insulator assembly 23 off the mold/mandrel and install in metal case 10.

A thin core 36, as shown in FIG. 4, which may be made of sheet metal or a suitable stiff and strong composite may be provided to hold the "S" shape during this process if necessary or desirable due to internal pressure needed for bonding. With the integral inhibitor/insulator 23 in place and bonded to the inside cylindrical and forward walls of the case 10, propellant may then be poured and cured to complete the formation of each of the propellant components 20 and 22 and thereby of the propellant grain assembly 18.

Thus, in accordance with the invention, there has been provided an end-burning structural arrangement with a very high mass fraction which is also very highly stress relieved structurally. This structural arrangement including the "S" shaped inhibitors 32 and 34 allows nearly the absolute maximum volume of propellant that can be loaded into an operational tactical motor. In addition, the "S" shape of the inhibitors 32 and 34 eliminates the relatively small radii present in the internal relief "Y" shaped arrangements used in the prior art and allows the propellant grain a large degree of freedom of movement. There is no loading of any significance anywhere in the grain except at the two locations where the case/grain bond terminates. The shape of the propellant grain and inhibitor makes the loading at these locations similar to a typical flap termination with a bulb. These strains could be lowered with a locally thicker bulb.

Additionally, the grain is fully case bonded. This feature is especially advantageous for surviving high acceleration loads during flight as well as shock and vibration during storage and handling.

Figure 5:
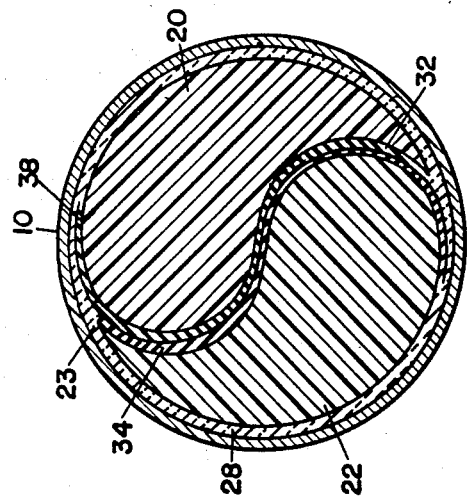
FIG. 5 illustrates a modification of the propellant grain structure according to the invention for providing greater stress relief by extending the unbond along the case at the top of the "S".

With this description of the invention in detail, those skilled in the art will appreciate that modifications may be made to the invention without departing from its spirit. Thus, variations in the structural arrangement providing greater stress relief may be possible by extending the unbond along the case at the top 38 of the "S", as illustrated in FIG. 5, and/or optimizing the internal "S" shape. Therefore, it is not intended that the scope of the invention be limited to the specific embodiments illustrated and described. Rather, it is intended that the scope of this invention be determined by the appended claims and their equivalents.

What is claimed is:

1. A high propellant mass fraction highly stress relieved end-burning grain structure for a rocket motor comprising,
    first and second longitudinal propellant components, said components being cured in side-by-side relation to create a cylindrical structure with internal mating surfaces, as seen in cross section, having a substantially "S" shape,
    at least one longitudinal inhibiting means having substantially an "S" shape in cross section formed on and completely covering the internal mating surfaces of said propellant components, and
    insulation means formed on and substantially completely covering the outer longitudinal surfaces of said components.

2. An end-burning propellant grain structure as defined by claim 1 wherein a first longitudinal inhibiting means having substantially an "S" shape in cross section is formed on and completely covers the internal mating surface of said first of said propellant components, and a second longitudinal inhibiting means having substantially an "S" shape in cross section is formed on and completely covers the internal mating surface of said second of said propellant components.

3. An end-burning propellant grain structure as defined by claim 2 wherein said first and second propellant components each have first and second ends with the first ends and second ends of each of said components being adjacent each other, respectively, and
    wherein said first inhibiting means also covers the first end of said first propellant component and said second inhibiting means also covers the first end of said second propellant component.

4. An end-burning propellant grain structure as defined by claim 1 wherein said insulation means includes a first portion that is formed on the outer longitudinal surface of said first propellant component and includes a second portion that is formed on the outer longitudinal surface of said second propellant component.

5. An end-burning propellant grain structure as defined by claim 4 wherein said first and second propellant components each have first and second ends with the first ends and second ends of each of said components being adjacent each other, respectively, and
wherein said first portion of said insulation means also covers the first end of said first propellant component and said second portion of said insulation also covers the first end of said second propellant component.

6. An end burning propellant grain structure as defined by claim 5 wherein a first longitudinal inhibiting means having substantially an "S" shape in cross section is formed on and completely covers the internal mating surface of said first of said propellant components, and a second longitudinal inhibiting means having substantially an "S" shape in cross section is formed on and completely covers the internal mating surface of said second of said propellant components.

7. An end burning propellant grain structure as defined by claim 6 wherein said first inhibiting means extends over and also covers the first end of said first propellant component, being covered, in turn, by said first portion of said insulation, and said second inhibiting means extends over and also covers the first end of said second propellant component, being covered, in turn, by said second portion of said insulation.

8. An end-burning propellant grain structure as defined by claim 7 further including
a rocket motor case having a closed end and an open end, and
means to bond the cylindrical structure comprising the assembled first and second components to the inside walls of said case.

9. An end-burning propellant grain structure as defined by claim 8 wherein said first ends of said first and second components are both bonded to the closed end of said case.

* * * * *